(12) United States Patent
Kazama et al.

(10) Patent No.: US 9,098,745 B2
(45) Date of Patent: Aug. 4, 2015

(54) SAMPLING POSITION-FIXING SYSTEM

(75) Inventors: Yoriko Kazama, Hanno (JP); Osamu Nishiguchi, Tokyo (JP); Masaaki Tanizaki, Nishitokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 896 days.

(21) Appl. No.: 13/151,585

(22) Filed: Jun. 2, 2011

(65) Prior Publication Data

US 2011/0299786 A1    Dec. 8, 2011

(30) Foreign Application Priority Data

Jun. 4, 2010 (JP) ................................. 2010-128406

(51) Int. Cl.
G06K 9/62    (2006.01)
G06K 9/00    (2006.01)
G06K 9/46    (2006.01)

(52) U.S. Cl.
CPC ............ G06K 9/0063 (2013.01); G06K 9/4652 (2013.01)

(58) Field of Classification Search
None
See application file for complete search history.

(56) References Cited

U.S. PATENT DOCUMENTS

| | | | | |
|---|---|---|---|---|
| 4,891,762 A | * | 1/1990 | Chotiros | 701/514 |
| 5,487,172 A | * | 1/1996 | Hyatt | 712/32 |
| 5,640,468 A | * | 6/1997 | Hsu | 382/190 |
| 7,324,666 B2 | * | 1/2008 | Zoken et al. | 382/113 |
| 2008/0059452 A1 | * | 3/2008 | Frank | 707/5 |
| 2008/0166016 A1 | * | 7/2008 | Sibiryakov et al. | 382/103 |
| 2011/0029234 A1 | * | 2/2011 | Desai et al. | 701/206 |
| 2011/0103648 A1 | * | 5/2011 | Wiedemann et al. | 382/103 |

FOREIGN PATENT DOCUMENTS

| | | |
|---|---|---|
| JP | 2000-236794 | 9/2000 |
| JP | 2004-012158 | 1/2004 |
| JP | 2008-032450 | 2/2008 |

OTHER PUBLICATIONS

Wei-Qiang Li et al., Relationship Between Soil Characteristics and Halophytic Vegetation in Coastal Region of North China, Pakistan Journal of Botany, 40(3), 2008, pp. 1081-1090.
J. A. Richards et al, Remote Sensing Digital Image Analysis, Springer, 2006, pp. 56-58.
M. Sonka et al., Image Processing, Analysis, and Machine Vision, PWS Publishing, pp. 307-308.
M. Sonka et al., Image Processing, Analysis, and Machine Vision, PWS Publishing, pp. 128-130.
M. Sonka et al., Image Processing, Analysis, and Machine Vision, PWS Publishing, pp. 74-76.
E. W. Dijkstra, A note on two problems in connexion with graphs, Numerische Mathematik, 1959, pp. 269-271, vol. 1.
J. B. Cambell, Introduction to Remote Sensing, Taylor & Francis, 2002, pp. 466-468.

* cited by examiner

Primary Examiner — Thomas Conway
(74) Attorney, Agent, or Firm — Baker Botts L.L.P.

(57) ABSTRACT

In the case of collecting samples, it is difficult to select a representative point of a target area. Thus, the samples are collected from certain positions, resulting in generation of variations of data. The target area is specified on an image to extract features from the target area. Further, clustering is performed for the features on a feature space to obtain representative features, and the obtained representative features are extracted as sampling points.

11 Claims, 19 Drawing Sheets

SAMPLING POSITION-FIXING SYSTEM

CLAIM OF PRIORITY

The present application claims priority from Japanese patent application JP2010-128406 filed on Jun. 4, 2010, the content of which is hereby incorporated by reference into this application.

BACKGROUND OF THE INVENTION

The present invention relates a system for fixing sampling positions.

It is difficult, in terms of labor and cost, to conduct sampling surveys throughout all target areas. Thus, a few points are sampled from the target area and the samples are analyzed.

In W-Q Li, et al., "Relationship between soil characteristics and halophytic vegetation in coastal region of north China", Pakistan Journal of Botany, 40(3), 1081-1090, 2008, there is described a diagonal method in which in order to uniformly fix positions as sampling points, the sampling points are fixed on a diagonal line of a target area at even intervals.

Further, Japanese Patent Application Laid-Open Publication No. 2004-012158 describes that plural points are measured at a certain area, obtained point data are interpolated to create a distribution diagram, and basic constituent elements such as inorganic components, organic components, humic substances, and solutions of soil are selected to be fixed as sampling points.

Further, Japanese Patent Application Laid-Open Publication No. 2008-032450 describes that inspection light is irradiated onto soil to obtain reflection light from the soil, and points where measured spectral data are changed are fixed as sampling points.

Further, Japanese Patent Application Laid-Open Publication No. 2000-236794 describes that in order to create nematode density distribution of soil, self-potential measurement is carried out to create distribution, and soil is collected at a point whose electric potential is different.

BRIEF SUMMARY OF THE INVENTION

However, in the diagonal method described in W-Q Li, et al., "Relationship between soil characteristics and halophytic vegetation in coastal region of north China", Pakistan Journal of Botany, 40(3), 1081-1090, 2008, if there is an area showing an abnormal value and the sampling point contains no abnormal area, actual conditions cannot be recognized.

Further, in Japanese Patent Application Laid-Open Publication No. 2004-012158, the sampling is performed on the basis of the distribution diagram obtained by interpolating the point data. Accordingly, the accuracy of extracting abnormal points and distribution of small-amount areas is heavily dependent on the positions of point measurement, and thus the abnormal points and the like cannot be recognized in some cases.

Further, in Japanese Patent Application Laid-Open Publication Nos. 2008-032450 and 2000-236794, it is difficult to set an adequate amount of changes in the sampling, and noise of measured data seriously affects the sampling. Thus, the accuracy of sampling cannot be enhanced.

A sampling position-fixing system according to an aspect of the present invention includes a memory that stores images and a computing unit. The computing unit extracts features from a target area. Further, clustering is performed for the features on a feature space, and a clustering result is displayed on a map to obtain representative positions in view of spatial distribution. The calculated result is stored in the memory. The other units will be described later.

As described above, the clustering is performed for the feature on the feature amount space, so that feature points can be selected as sampling points. Thus, adequate sampling positions can be fixed.

DETAILED DESCRIPTION OF THE INVENTION

[First Embodiment]

Hereinafter, preferred modes (hereinafter, referred to as embodiments) for carrying out the present invention will be described in detail with reference to the drawings (drawings other than those mentioned will be arbitrarily referred to). It should be noted that each accumulating unit is realized by a hard disk or a memory on a computer in the embodiments. Alternatively, a hard disk on a network may be used. Further, each processing unit is executed by reading a program in a computer. Alternatively, each processing unit may be realized in combination with hardware and software.

Figure 1:
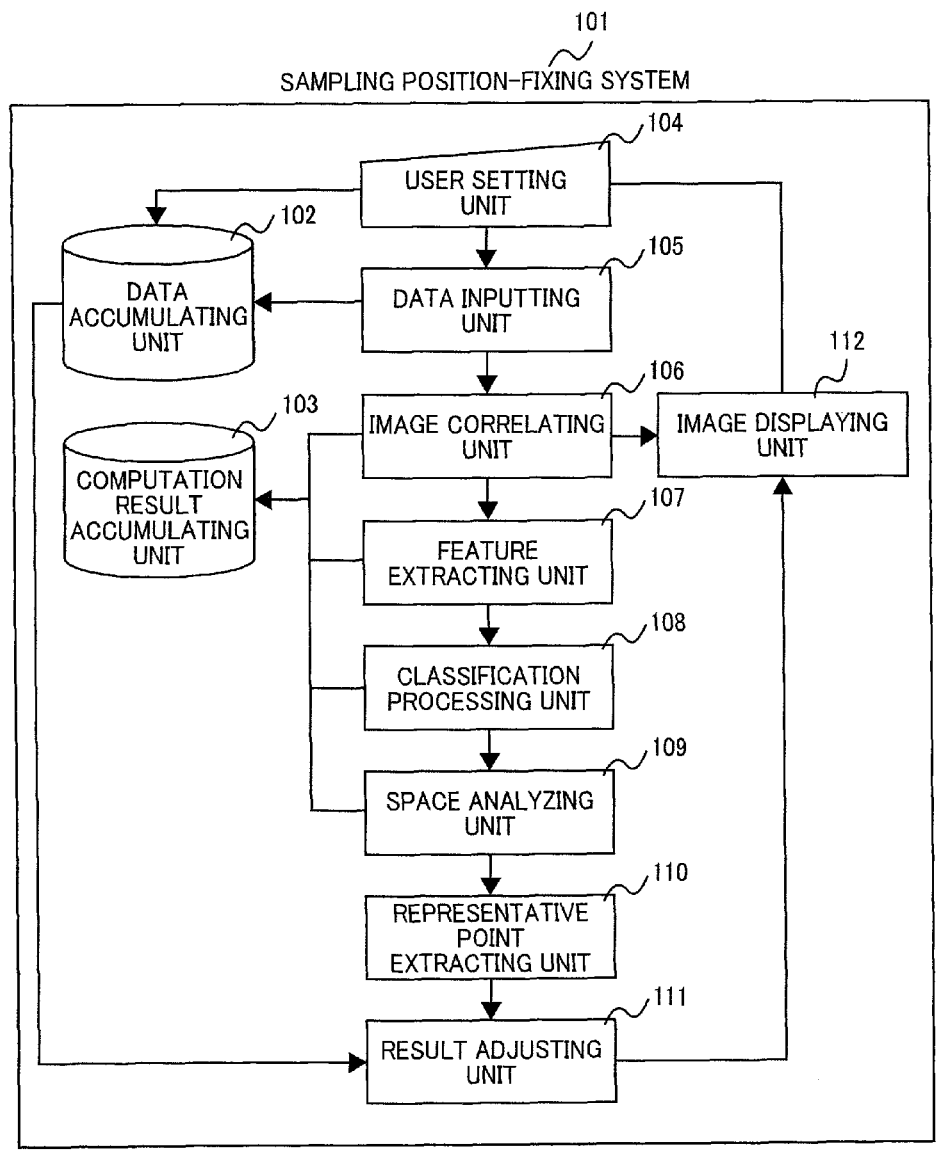
FIG. 1 is a functional configuration diagram of a sampling position-fixing system in an embodiment.
Figure 2:
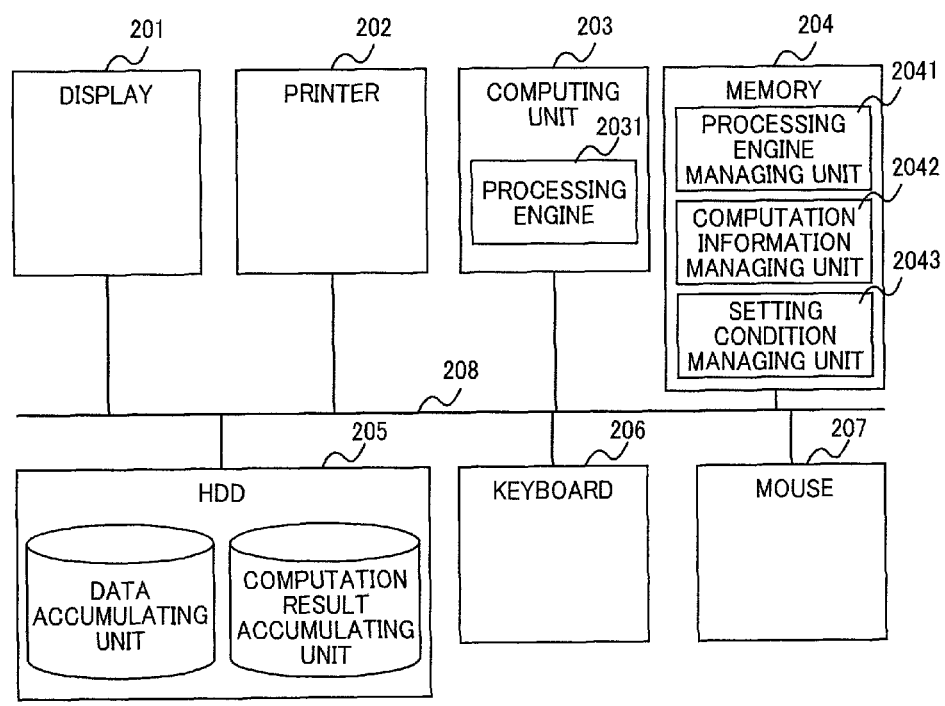
FIG. 2 is a physical configuration diagram of the sampling position-fixing system in the embodiment.
Figure 3:
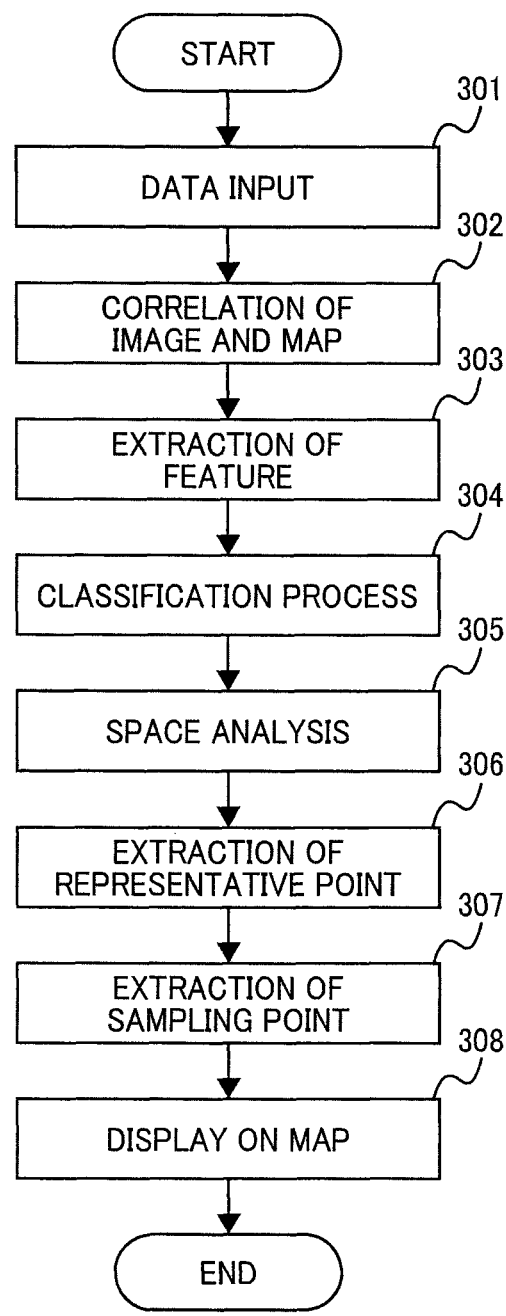
FIG. 3 is a diagram for showing a processing flow in the embodiment.

With reference to FIG. 1, FIG. 2, and FIG. 3, a configuration of a sampling position-fixing system of the embodiment will be described. FIG. 1 is a functional configuration diagram of a sampling position-fixing system 101 of the embodiment. FIG. 2 is a physical configuration diagram of the sampling position-fixing system 101 of the embodiment. FIG. 3 is a diagram for showing a processing flow in the embodiment.

As shown in FIG. 1, the sampling position-fixing system 101 is configured to include a user setting unit 104, a data inputting unit 105, an image correlating unit 106, a feature extracting unit 107, a classification processing unit 108, a space analyzing unit 109, a representative point extracting unit 110, and a result adjusting unit 111, all of which function as processing units, and a data accumulating unit 102 and a computation result accumulating unit 103, all of function as storing units (accumulating units). Further, the sampling position-fixing system 101 includes an image displaying unit 112.

The data accumulating unit 102 accumulates (stores) a target image and map data. The target image is, for example, a satellite image taken by a multiband sensor, and position information is attached. The target image is not limited to the satellite image, but may be an aerial image, an image taken by a helicopter, an image taken by an unmanned reconnaissance plane, a ground-measured image or the like. Further, the image is not limited to a single image, but may be plural time-series images or plural images taken by plural sensors or the like. The map data are computerized data, and include vectors such as polygons, attribute information and position information. A label, an attribute, position information and the like are stored in the attribute information and the position information. The position information is stored as, for example, vector data. In addition, the position information may be a coordinate corresponding to the image, or may be longitude and latitude information or the like expressed by a desired map projection. The map data are not limited to a map, but may be an image drawn by a user or position information collected by knowledge processing from document information. Further, the embodiment shows a configuration in which the data accumulating unit is held inside the sampling position-fixing system. However, the data accumulating unit may be installed outside the sampling position-fixing system to transmit and receive stored information via a network or the like.

The user setting unit 104 accepts a setting of an analyzing target and a setting of a sampling number input by the user. The accepted input information is stored in the data accumulating unit 102.

The data inputting unit 105 inputs the image as the analyzing target designated by the user, or inputs the map data of the same area to be stored in the data accumulating unit 102. Further, information such as the name or ID of an analyzing target area designated by the user is stored in the data accumulating unit 102. One or more analyzing targets may be designated.

The image correlating unit 106 correlates the image input by the data inputting unit 105 with the position of the map data. Position adjustment is automatically performed using the position information added to the image and the map data (Remote Sensing Digital Image Analysis, Springer, J. A. Richards and X. Jia, pp. 56-58, 2006). Further, position adjustment may be performed by manually extracting corresponding points from the image and the map data. The extracted corresponding-point information is stored in the computation result accumulating unit 103.

Information of the target area input by the data inputting unit 104 is extracted from the attribute information of the map data in the correlated image, and an area having the corresponding attribute is arranged on the image.

The feature extracting unit 107 extracts features from the analyzing target area arranged on the image by the image correlating unit 106. The feature is spectral data of each pixel obtained from a spectral image (spectroscopic image). In the case where an object included in an area where clustering is performed contains similar spectrum (for example, in the case where only vegetation is included but is different in type), it is necessary to focus on not the absolute value of the spectrum but the shape of the spectrum (difference in spectrum between wavelengths). In that case, the value obtained by normalizing the spectral data is used as the feature. For example, normalized data of two wavelengths may be used, or the spectral data may be normalized so as to fall within the minimum or maximum value set for all wavelengths. Further, the absorption band of the spectrum may be emphasized to be used as the feature.

The feature may be an average value in a certain area. In this case, noise contained in the area can be reduced. Further, if a value calculated by a filtering process or computation data between bands are used, a small feature difference between values of pixels or values in the area can be emphasized, and the accuracy of clustering to be described below can be enhanced. In the case where an image taken by a synthetic aperture radar or laser data are used, an intensity value obtained from an intensity image is used. Further, complex number data or a scattering coefficient may be used. Accordingly, the value of brightness of radar data or an image taken by a digital camera can be used. A digital camera is generally capable of obtaining three-band data of RGB, and thus the values of RGB can be used as the features. One or more features may be extracted. In the case of combining multiple features, selection of multiple features having a complementary relation can increase the degree of separation in each distribution on a feature space in a clustering process to be described below, and the accuracy of clustering can be improved.

The obtained features are expressed as feature vectors. The feature vectors have multiple dimensions. In addition, the feature vector may have one-dimensional data (one value). The extracted feature vectors are stored in the computation result accumulating unit 103.

The classification processing unit 108 plots the feature vectors extracted by the feature extracting unit 107 on a feature space to perform clustering for the feature vectors. The clustering is performed using a k-Means method (Image Processing, Analysis, and Machine Vision, M. Sonka, V. Hlavac, and R. Boyle, PWS publishing, pp. 307-308) or the like. The clustering method is not limited to this. Further, instead of the clustering process, the feature space may be displayed by selecting an appropriate dimension of the featurevectors, and the user may input on the feature space to create clusters. Further, a threshold process of the feature may be performed. The threshold may be set by the user, or may be automatically obtained by an automatic threshold setting method (Image Processing, Analysis, and Machine Vision, M. Sonka, V. Hlavac, and R. Boyle, PWS publishing, pp. 128-130).

The clustering is performed as described above using the features, so that plural elements configuring a target area can be automatically extracted. The multiple elements are constitutional elements such as softwoods and hardwoods included in the area. Further, because it is assumed that statistical distribution is used, effects of noise can be reduced, and abnormal data and the like can be easily deleted.

The number of clusters obtained by the clustering may be arbitrarily set by the user, or the maximum and minimum numbers of clusters may be set in advance. In the clustering process, the clusters are automatically integrated or divided so that the number of clusters becomes the set number. Accordingly, a desired number of clusters can be obtained.

A cluster number is allocated to the feature extracted for each pixel. The cluster numbers are mapped on the image to create a clustering result image.

The space analyzing unit 109 performs a filtering process for the clustering result image created by the classification processing unit 108 to smooth the area and to remove the noise of the area. In the filtering process, for example, a median process (Image Processing, Analysis, and Machine Vision, M. Sonka, V. Hlavac, and R. Royle, PWS publishing, pp. 74-76) or the like is used. Further, spatially-adjacent pixels having the same clustering number are coupled to each other to form plural small areas. If the formed small area is smaller than a predetermined minimum area, the formed small area is integrated with an adjacent area. Accordingly, an area-divided diagram in which effects of noise are eliminated can be obtained.

The representative point extracting unit 110 obtains a representative point of each area from the area-divided diagram created by the space analyzing unit 109. For example, the representative point extracting unit 110 calculates the centroid of each area as a representative point.

Plural representative points are obtained from the same cluster in some cases by the representative point extracting unit 110 because plural areas belonging to one cluster are generated. In such a case, for example, the representative point of the largest area is stored by the result adjusting unit 111, and the other representative points of the same cluster are removed. With this process, one representative point can be extracted for each cluster. Further, in the case where plural areas belonging to the same cluster are present and located extremely far from each other, plural representative points may be extracted from the same cluster.

The image displaying unit 112 displays the representative points extracted by the result adjusting unit 111 on the image or the map as sampling positions. Further, an original image read from the data accumulating unit 102 may be laid out and displayed to help the user easily view the sampling positions. Further, reduced and enlarged images may be laid out and coordinated to help the user easily view the sampling positions.

The map data read from the data accumulating unit 102 and the area-divided diagram created by the space analyzing unit 109 may be displayed while they are overlapped with each other to display a relation between the distribution of the areas and the sampling positions.

Next, a physical configuration of the sampling position-fixing system 101 will be described. As shown in FIG. 2, the sampling position-fixing system 101 is configured to include a display 201, a printer 202, a computing unit 203, a memory 204, an HDD (Hard Disk Drive) 205, a keyboard 206, and a mouse 207, all of which are coupled to each other through a bus 208.

The display 201 displays data such as an input image.

The printer 202 outputs input data to a printer or the like.

The computing unit 203 includes various types of processing engines 2031. When a process command is input, the computing unit 203 reads the corresponding engine software from the memory 204, and reads accumulated data from the HDD 205, if necessary, to perform predetermined computation. Further, the computing unit 203 outputs a calculated result to the memory 204.

The memory 204 includes a processing engine managing unit 2041, a computation information managing unit 2042, and a setting condition managing unit 2043. The processing engine managing unit 2041 manages software for each engine used in calculation by the computing unit 203. The computation information managing unit 2042 manages calculation results calculated by the computing unit 203. The setting condition managing unit 2043 stores and manages conditions input from the keyboard 206 or the mouse 207.

The HDD 205 includes the data accumulating unit 102 and the computation result accumulating unit 103 each storing data. Each piece of data is managed using an ID such as ID number 1305 for efficient access. When a command of reading data from the HDD 205 is input, target data are accessed and read. It should be noted that the HDD 205 may be installed on a network. The sampling position-fixing system 101 may include a network interface, and respective constituent elements such as the HDD 205 may be installed on a network.

The keyboard 206 and the mouse 207 are units manipulated by the user who inputs various types of setting conditions.

FIG. 3 is a diagram for showing a processing flow in the embodiment.

In Step 301, the user setting unit 104 accepts an input from the user, and the data inputting unit 105 inputs an image and map data as processing targets designated by the user, so that the data are accumulated in the data accumulating unit 102.

In Step 302, the image correlating unit 106 correlates the image of the input data with the position of the map data, and extracts an analyzing target area from the map data to extract the corresponding image area.

In Step 303, the feature extracting unit 107 extracts the feature vectors from the analyzing target area on the image extracted by the image correlating unit 105.

In Step 304, the classification processing unit 108 performs the clustering process for the feature vectors extracted by the feature extracting unit 107, and allocates a cluster number to each feature. With reference to the positions of the features and the cluster numbers, the clustering result image is created.

In Step 305, the space analyzing unit 109 performs a predetermined space process such as filtering for the clustering result image created by the classification processing unit 108.

In Step 306, the representative point extracting unit 110 recognizes areas from the image obtained after the space process, and extracts the representative point from each area.

In Step 307, the result adjusting unit 111 selects the extracted points so that the number of representative points extracted from each cluster in Step 306 becomes one. Specifically, only the representative point of the largest area among those belonging to the same cluster is selected. The representative points are defined as sampling points.

In Step 308, the image displaying unit 112 displays the sampling points extracted in Step 307 on the map or the image.

Figure 4:
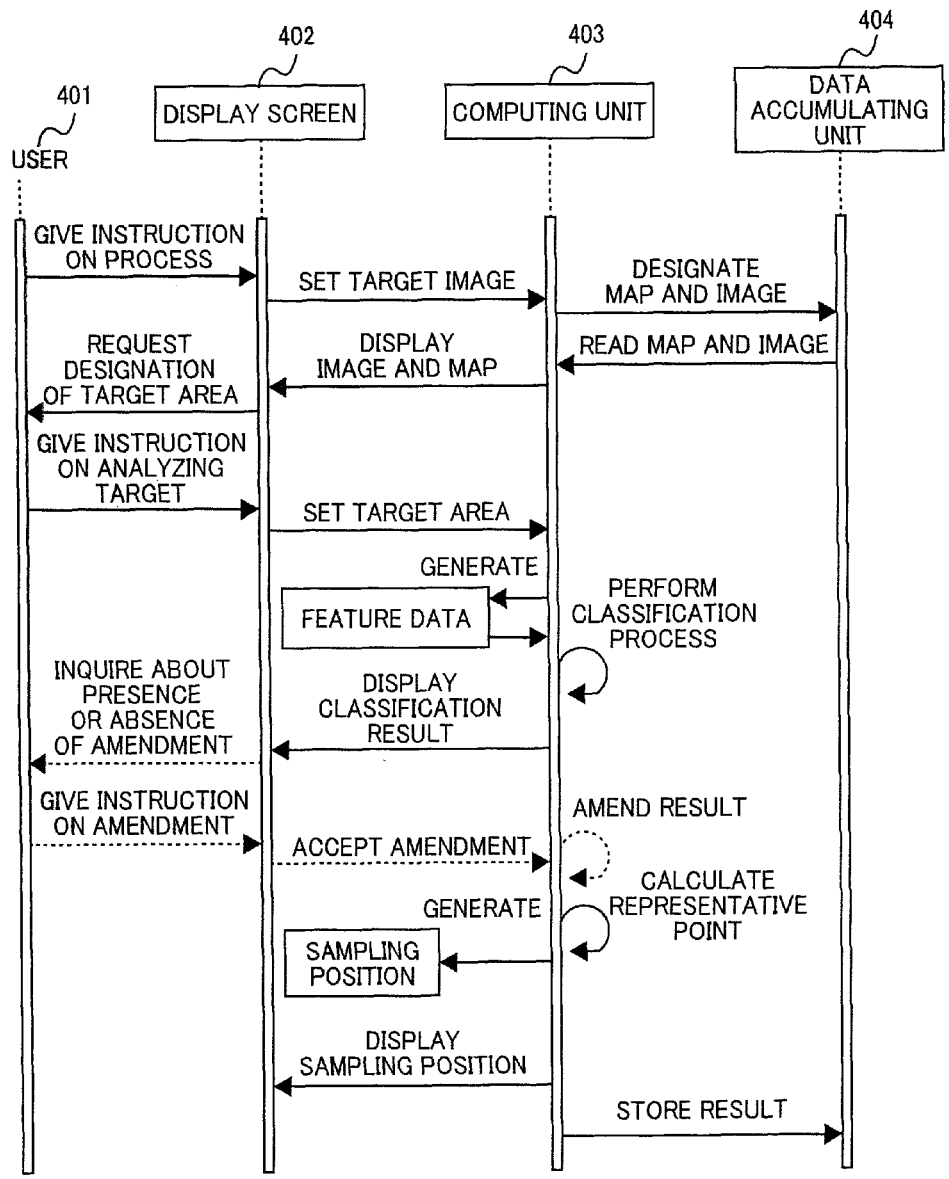
FIG. 4 is a diagram for showing a sequence diagram in the embodiment.

FIG. 4 is a diagram for showing a processing sequence in the embodiment. When a user 401 gives an instruction to start a process and selects a processing target image on the display screen 402, the computing unit 403 is notified of setting information of the processing target image. The computing unit 403 designates a target map and a target image of the data accumulating unit 404, and reads necessary data from the data accumulating unit 404.

Next, the computing unit 403 displays the read image and map on the display screen 402 to request the user 401 to designate an analyzing target area. The user 401 gives an instruction on a processing target area and an object on the display screen 402. Here, the user 401 may select the processing target area with the mouse or the like, or may input the ID number or the like of the target area. Further, plural processing target areas may be selected.

The computing unit 403 sets the designated target area on the image and the map read from the data accumulating unit 404. The computing unit 403 creates feature data from the designated area in accordance with a predetermined set method. The computing unit 403 performs a classifying process on the basis of the created feature data. A classification result image is displayed on the display screen 402. The user may be inquired about the necessity of amendment of the classification result on the display screen 402. In response to the inquiry, the user may give an instruction to amend the classification result. The computing unit 403 accepts the amendment, and amends the result in accordance with the instruction of amendment.

The computing unit 403 calculates the representative points from the classification result, and creates the sampling positions. The generated sampling positions are displayed on the display screen 402. The computing unit 403 stores the sampling positions and the classification result in the data accumulating unit 404.

[Second Embodiment]

Next, as an example of use of the sampling position-fixing system, an example of fixing soil sampling positions in a farm using a map and an image will be described with reference to FIG. 5.

Figure 5:
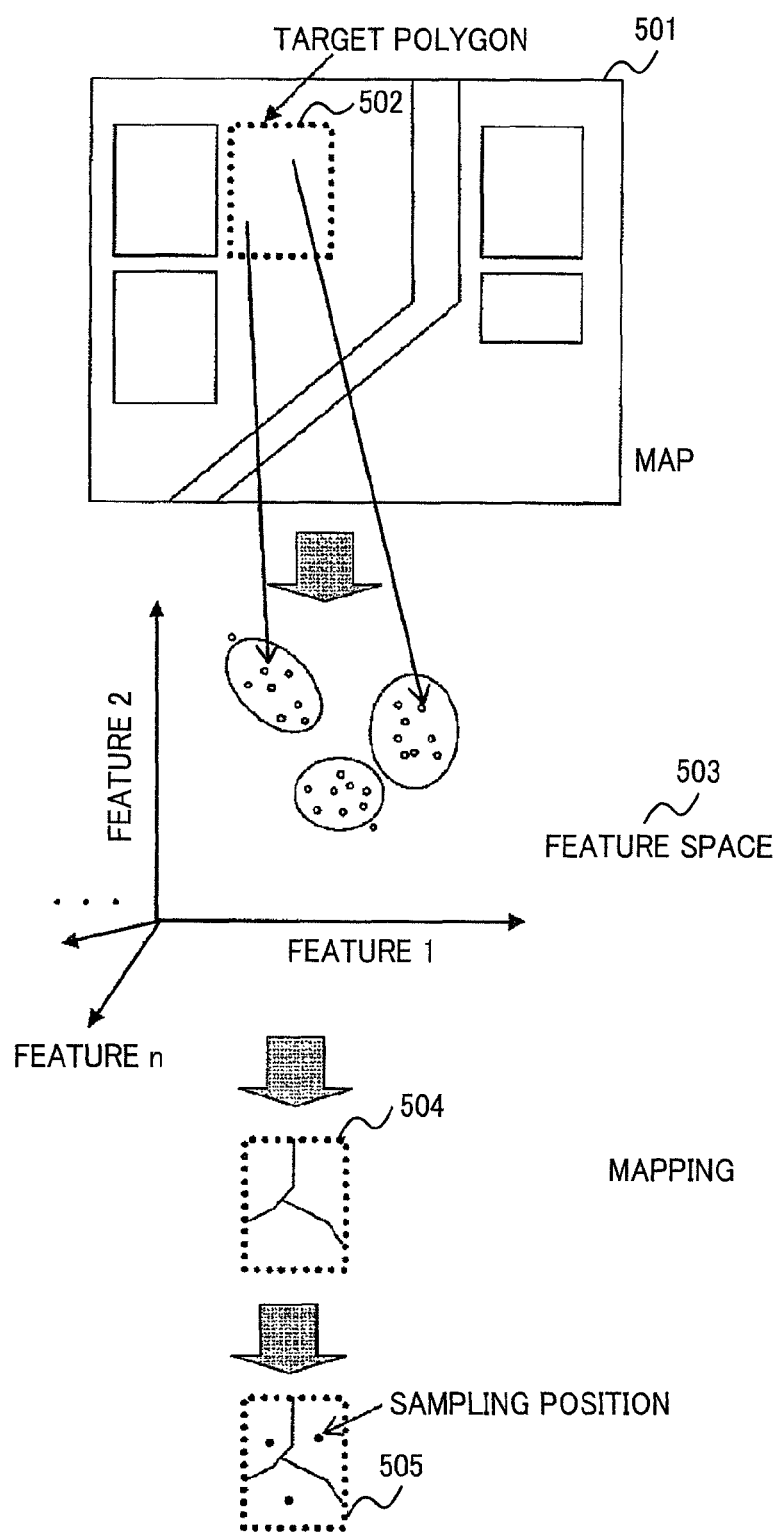
FIG. 5 shows an example of a result obtained by a sampling position fixing process in the embodiment.

FIG. 5 is an example in which clustering is performed in a target polygon and three sampling points are fixed in an analyzing target polygon 502. Map data 501 include area polygons as map information. The area polygons are, for example, a farm, a parking lot, an empty lot, and the like. Further, a satellite image with corresponding position information is present in the map data 501. Here, instead of the satellite image, an aerial image, an image taken by a flying object, or an image taken from the ground may be used. The target polygon 502 set by the user has position information and shape information, and the image correlating unit 106 sets an image area corresponding to the target area 502 designated on the map. Further, the target polygon may be directly designated on the image instead of on the map. For example, the user may draw a polygon or the like on the image as an analyzing target area.

The feature extracting unit 107 extracts the features from the designated target polygon, and maps the features on a feature space 503. Here, the points on the feature space 503 represent the feature vectors obtained by expressing the features using vectors. In the case where the feature is extracted for each pixel, the number of feature vectors becomes equal to that of pixels in the polygon area. Further, the average value or representative value of small areas obtained by dividing the polygon may be used instead of the feature of each pixel. The features are, for example, spectral information extracted from an image having the spectral information. The spectral information may be a value such as a reflection ratio or an emissivity. In addition, the spectral information may be the value of brightness or a pixel value. In the case where the target image has no spectral information, the value obtained by performing a filtering process for the image may be used or a pixel value may be used. Further, the pixel values of plural images corresponding to the same polygon or an arithmetic value between plural images may be used.

The classification processing unit 108 performs the clustering for the features mapped on the feature space to form a desired number of clusters. The number of clusters may be set by the user, or the maximum and minimum numbers of clusters may be set in advance. In the case where the number of clusters created is different from the set number, the clusters are integrated with each other or divided to adjust the number of clusters. Further, the number of clusters may be set by the user so that the cluster distributions are optimally separated from each other on the feature space. Furthermore, the degree of separation of the cluster distributions can be expressed by distances between the centers of the clusters and degrees at which the clusters are overlapped with each other. Therefore, the degree of separation is obtained while the number of clusters is sequentially changed, and the number of clusters with the optimum degree of separation may be automatically set as the optimum number of clusters. However, if the number of clusters is sequentially changed with no limit, the degree of separation is maximized when the number of clusters becomes equal to that of features. In such a case, the clustering means nothing, and the sampling points cannot be extracted. Therefore, the upper and lower limits of the number of clusters are set, and the number of clusters needs to be changed within the range. Further, the minimum number of features included in the clusters may be set. With this process, a result of the highest degree of separation of the clusters can be automatically calculated.

After the clustering, cluster numbers are allocated to the respective features. Mapping the cluster numbers at pixels (positions) where the features are extracted results in a result image 504. The result image 504 is an example which includes plural areas. The space analyzing unit 109 recognizes divided areas in the target polygon of the mapping result image 504. For example, the target polygon is divided into the plural areas by a labeling process. In FIG. 5, the target polygon can be divided into three areas as shown in the mapping result image 504. The representative point extracting unit 110 obtains and extracts the centroid of each of the three areas as a soil sampling point. The extracted sampling points are displayed on the map or the image by the image displaying unit 112. The extracted sampling points may be displayed as points on the mapping result image 504 as shown in a sampling position display image 505, or may be displayed on the map or the image. Further, symbols such as circles and arrows, or text may be displayed as expressions of the sampling positions. Further, the sampling positions may be displayed as sampling recommendation areas, instead of points.

In order to perform the sampling on the basis of the sampling points obtained in the present invention, position information such as latitude and longitude information is added to the map or the image on which the extracted sampling points are displayed to be output on a sheet of paper or the like. Further, the sampling points may be displayed as symbols and the like on a map that can be displayed on a mobile terminal or the like. The soil sampling is performed at a predetermined position in the field on the basis of the sampling point information. Further, information of the position where the sampling is being actually performed is obtained by a GPS or the like. After the sampling, the latitude and longitude of the actual sampling point may be transmitted to a server or the like from a mobile terminal or the like to be managed in the server. Further, an ID number is automatically or manually added to each sampling point extracted in the present invention and the ID is written to each sample, so that the position information such as latitude and longitude information can be correlated with the sample. Accordingly, the analysis results of the samples can be expressed on the map again, and the distribution of the target areas can be recognized. Further, the sampling results are extrapolated and data obtained as points can be displayed while being extended to plane information. Further, a calibration curve is created using the analysis results of the samples obtained from the sampling points and the spectral information of the corresponding satellite image, and a sample analysis value is inversely estimated from the spectral data of the satellite image, so that an analysis map can be created.

Here, the configuration explained in the embodiment not only fixes the soil samples, but also can be applied to sampling in surveys such as a present-state survey of crops, a crop damage survey, a forest survey, a forest tree-type survey, a pest survey, a thinning survey, a soil contamination survey, a water quality survey, and a water contamination survey. Further, the configuration explained in the embodiment can be applied to fixing of a point where surveys or measurements are conducted, instead of sampling. For example, the configuration explained in the embodiment can be applied to fixing of a check point for a bank.

A desired number of sampling points showing constituent elements of the target area can be extracted by the configuration explained in the embodiment.

[Third Embodiment]

Next, as an application of the sampling position-fixing system, a process when a clustering result belonging to the same cluster is distributed at plural areas will be described with reference to FIG. 6 and FIG. 7.

Figure 6:
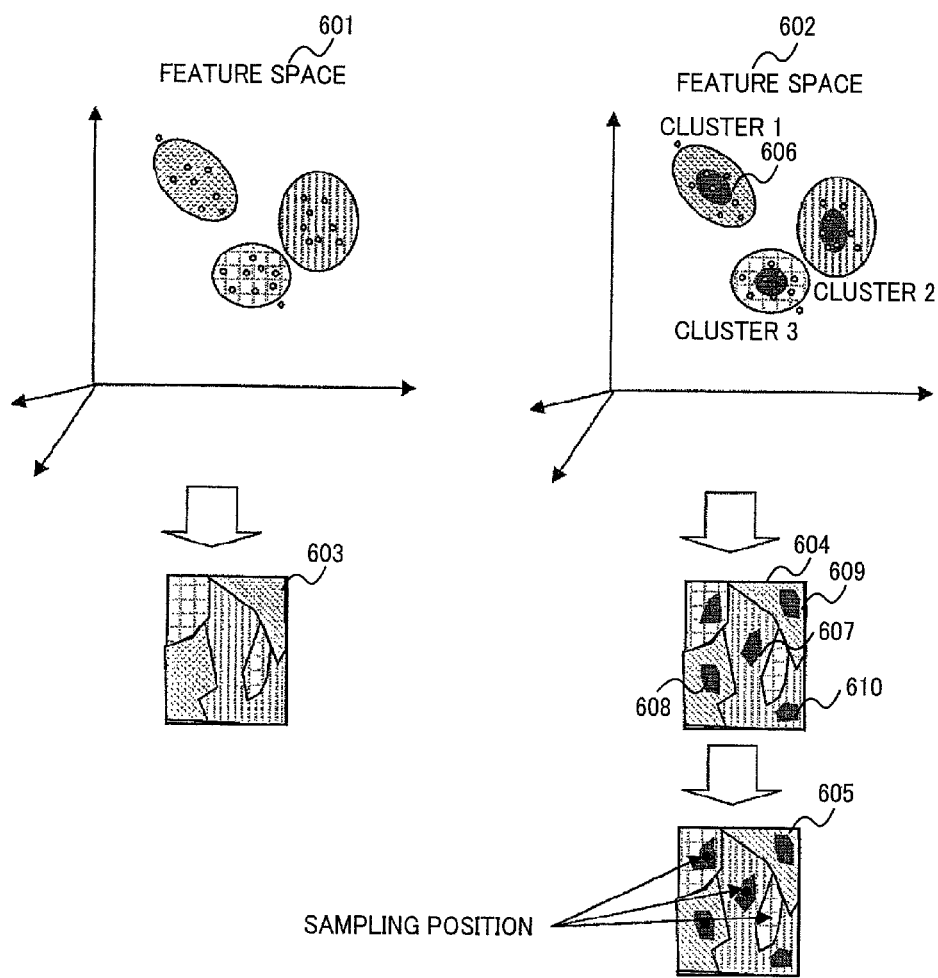
FIG. 6 shows an example of the sampling position fixing process in which sampling positions are extracted from the vicinities of the centers of clusters in the embodiment.
Figure 7:
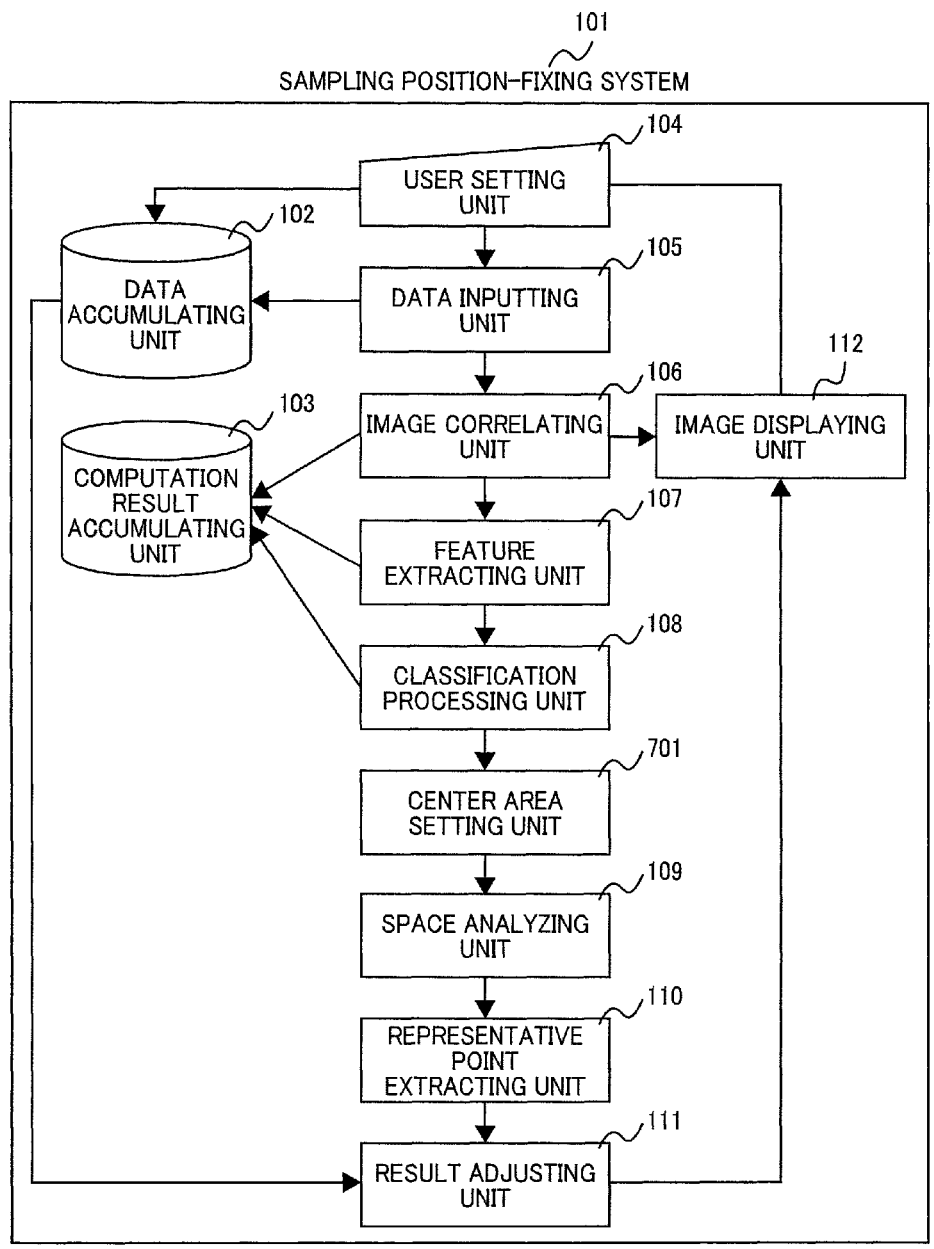
FIG. 7 is a functional configuration diagram of the sampling position-fixing system to which a center area setting unit is added in the embodiment.

FIG. 6 shows an example in the case where a result image obtained by clustering a target polygon has plural areas. FIG. 7 is a diagram for showing an application of the sampling position-fixing system.

The feature extracting unit 107 features the features from the target polygon, and the features are mapped on a feature space 601 while they are expressed as feature vectors. The classification processing unit 108 performs the clustering so that the number of feature vectors become equal to a desired number of clusters. When the clustering result is mapped on the image, plural areas belonging to the same cluster are generated as shown in a clustering result image 603. In this case, the representative features of the clusters are expressed in the vicinities of the centers of the clusters as shown on a feature space 602, and a center area setting unit 701 extracts the feature vectors located in the vicinities of the centers of the clusters. Here, the vicinity of the center of the cluster is expressed by an area 606. The radius or diameter of the vicinity of the center of the cluster, or the standard deviation (3σ or the like) of distribution may be set by the user setting unit 104. Alternatively, a distance may be set in advance. A distance from the center of the cluster may be an Eucliden distance or a Mahalanobis' generalized distance. Further, an arbitrary number n of features may be designated to be extracted from the centers of the clusters.

Mapping the feature vectors corresponding to the cluster center area 606 on the image or the map results in a clustering result 604. The feature in the vicinity of the center of the cluster is distributed as an area 607 on the clustering result image 604. For example, areas belonging to a cluster 1 are separately located as two areas 608 and 609 on the clustering result 604. Since one representative point is extracted from one cluster as a sampling position, the representative point extracting unit 110 extracts the representative point from the largest area. It is convenient in practical work if the representative point is sampled from a larger area, because another sample is less likely to be mixed at the time of sampling, and options of the sampling points increase. In FIG. 6, the representative point is extracted from the area 608 because the cluster area where the area 608 is located is larger between the areas 608 and 609 belonging to the cluster 1. The representative point is selected from the area represented by the distribution 608 in the vicinity of the center of the cluster. The representative point may be extracted using the centroid of the distribution 608 in the vicinity of the center of the cluster, or may be randomly extracted. Further, the position corresponding to the feature vectors nearest to the center of the cluster on the feature space 602 may be extracted as a representative point. Areas 607 and 610 belong to the same cluster, and shows areas near the center of the cluster distribution on the feature space 602. As described above, in the case where plural small areas obtained from the vicinities of the centers of the clusters are distributed in the same area, the representative point may be extracted from any of the small areas. In the clustering result 604, the representative point is extracted from the area 607 in consideration of easiness of sampling on the basis of distances from other representative points.

Mapping the extracted representative points on the image as sampling positions results in a sampling position-fixed result image 605. The sampling positions are expressed using symbols such as points.

In the case where one or more sampling points are to be extracted from the same cluster, the areas are selected in descending order in size to extract plural sampling points.

[Fourth Embodiment]

Next, an example of displaying the shortest route of a sampling point will be described with reference to FIG. 8 and FIG. 9.

Figure 8:
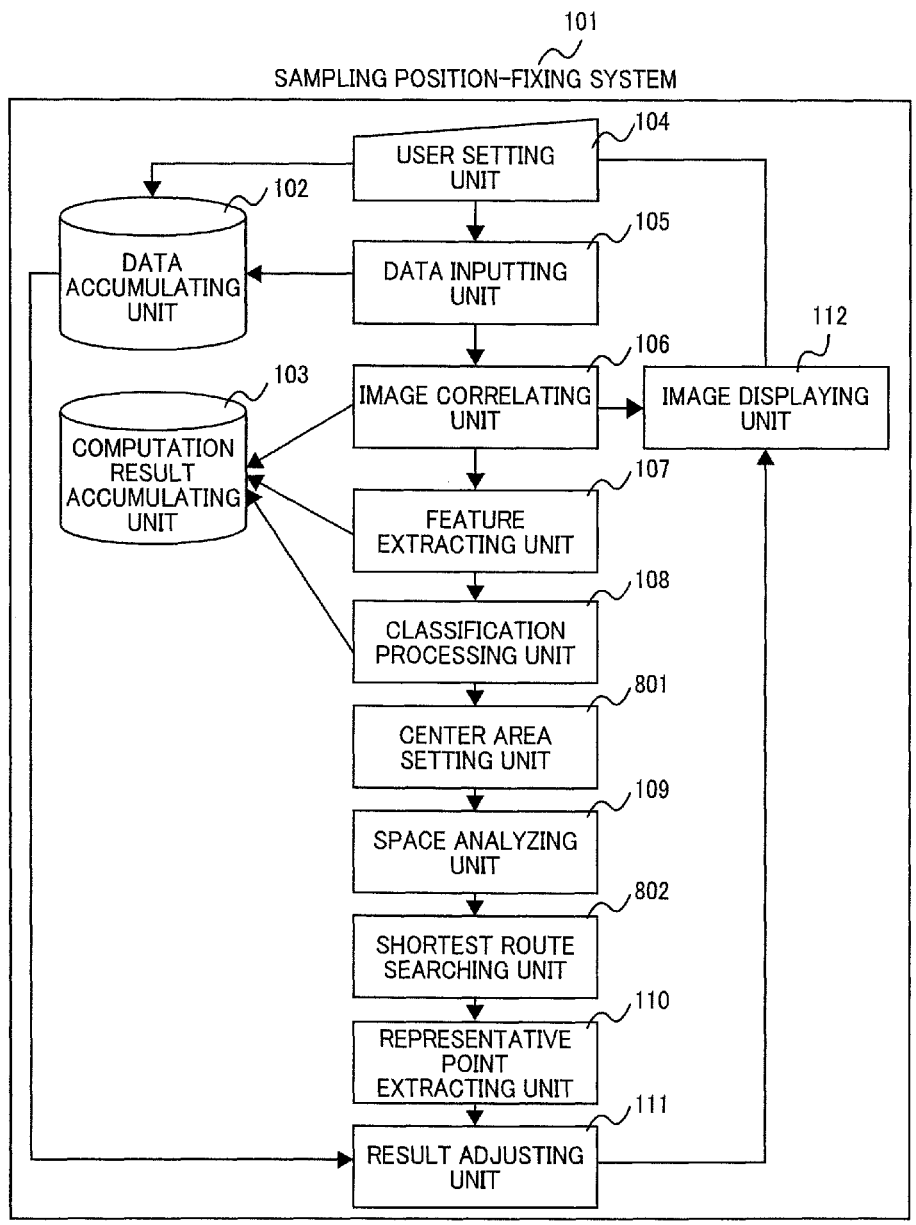
FIG. 8 is a functional configuration diagram of the sampling position-fixing system to which a shortest route searching unit is added in the embodiment.
Figure 9:
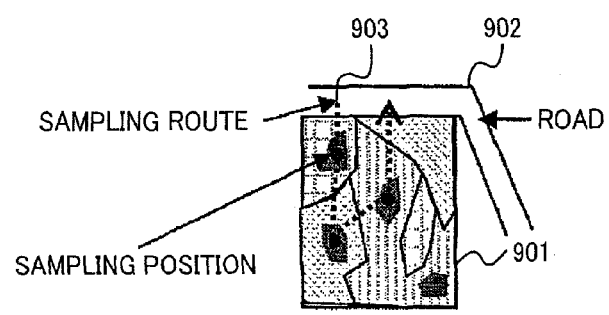
FIG. 9 shows an example of a result of a process in which the sampling positions are fixed by shortest route searching in the embodiment.

FIG. 8 shows an application in which a shortest route searching unit is added to the sampling position-fixing system. FIG. 9 shows an example in which the shortest route is searched for and displayed.

As shown in FIG. 6 of the third embodiment, the features are extracted from the target polygon for clustering to create a result image 901. Further, a center area setting unit 801 extracts an area in the vicinity of the center of each cluster on the feature space to be displayed on the result image 901. Here, plural areas in the vicinities of the centers of the clusters are present. In the third embodiment, the representative position is fixed first at the largest area. However, the representative position is selected based on easiness of sampling in the embodiment.

Access is gained from an adjacent road to the area designated by the target polygon. Therefore, a route from a designated access point to the sampling point is obtained. The user designates a position from which the target polygon area is accessed, for example, one point on a road 902. Further, instead of one point on the road, the road 902 may be designated. The shortest route searching unit 802 selects a sampling position which can be accessed at the shortest distance from the designated access point. In the shortest distance searching, candidate sampling points are all points included in the areas belonging the vicinities of the centers of the clusters on the clustering result image created by the space analyzing unit 109. In the case where plural areas belonging to the same cluster are present, all combinations are calculated on the assumption that one of the areas is selected. One route with the shortest distance among the all routes and the sampling points are selected. The selected sampling points are extracted as representative points by the representative point extracting unit 110. The result adjusting unit 111 searches for the shortest route 903 connecting the representative points extracted by the representative point extracting unit 110, and displays the same on the image. A Dijkstra method (E. W. Dijkstra, A note on two problems in connexion with graphs, Numerische Mathematik, Vol 1, pp. 269-271, 1959) or other searching algorithms may be used in the route searching.

Accordingly, the shortest route connecting plural sampling points can be shown for efficient sampling.

[Fifth Embodiment]

Next, an example in which sampling target areas are selected from plural polygons which are drawings showing areas included in map data to extract sampling points will be described with reference to FIG. 1 and FIG. 10. Attribute information is added to each polygon in the map data, and areas as sampling targets can be fixed on the basis of the attribute information. For example, plural farms included in a certain area are considered as polygons.

Figure 10:
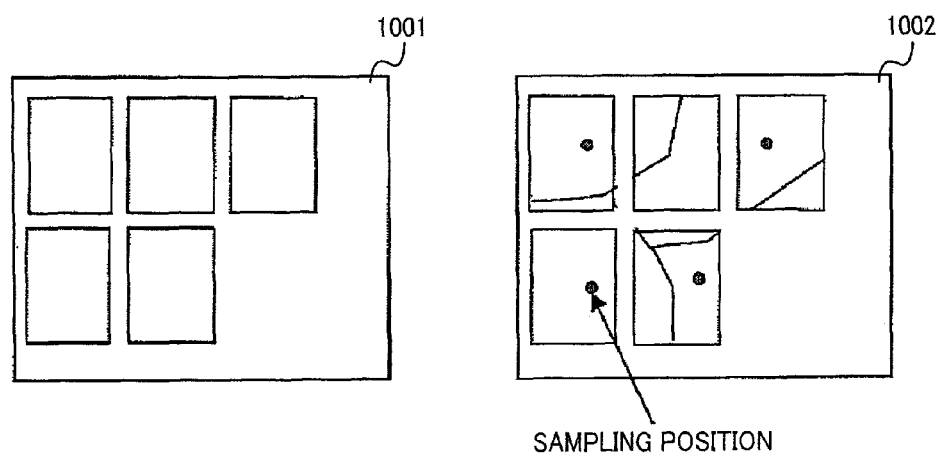
FIG. 10 shows an example of a result of a process in which the sampling positions are fixed by selecting plural areas in the embodiment.

FIG. 10 shows an example in which when plural polygons that are adjacent to each other are present, a sampling point is not extracted from each polygon, but sampling points with a desired sampling number are extracted from the plural polygons.

The user setting unit 104 accepts designation of plural target polygon areas on a map 1001. The feature extracting unit 107 extracts the features from the plural designated polygon areas to be mapped on the feature space. The classification processing unit 108 performs the clustering process on the feature space to be classified into a desired number of clusters. The space analyzing unit 109 displays the clustering result on the image or the map. The clustering result is expressed on the plural polygons. The space analyzing unit 109 integrates small areas, each having a specified size or smaller, with each other. The representative point extracting unit 110 extracts the representative points from the divided areas. The representative points are centroid points in the largest target cluster area. In the case where the centroid point is out of the polygon area, the representative point is extracted from the cluster area in the nearest polygon. Further, the representative point may be extracted from the cluster area included in each polygon, so that one representative point is selected from each cluster. As a selecting method, the representative points may be selected on the basis of the shortest route, so that the distance connecting the respective sampling points becomes shortest as shown in the fourth embodiment. A map 1002 shows an expression after mapping the representative-point extraction result on the map.

Accordingly, even in the case where the target areas are located or distributed across plural areas, a desired number of sampling points can be fixed.

[Sixth Embodiment]

Figure 11:
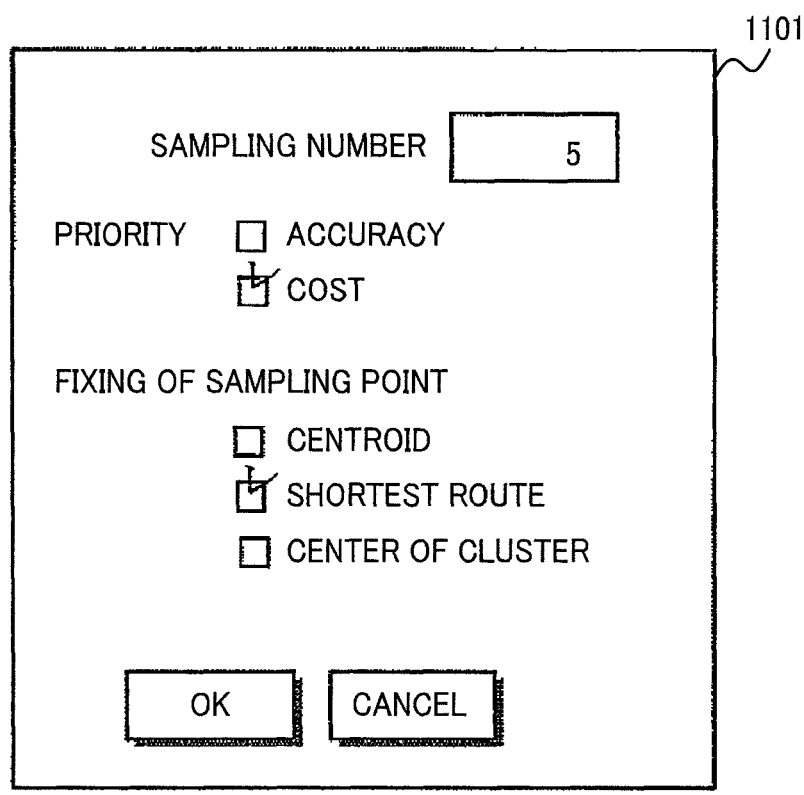
FIG. 11 shows an example of a user setting screen in the embodiment.

Next, an example of a screen on which the user sets a process will be described with reference to FIG. 11.

A sampling number, a priority, and a sampling point fixing method are input with a user setting screen 1101. The sampling number represents a number selected from the target polygon. For example, accuracy or cost can be selected at the priority section. If the sampling number increases, costs incurred by sampling and analysis increase. Thus, if the cost is given a priority, the classification processing unit 108 adjusts the sampling number to be equal to, or less than the designated sampling number. Further, if the accuracy is given a priority, the classification processing unit 108 adjusts the number of clusters, so that the degree of separation of the cluster distribution is increased on the feature space. In the sampling point fixing method, for example, the centroid, the shortest route, or the center of the cluster is selected. If the centroid is selected, the representative point extracting unit 110 extracts the centroid points of the cluster areas on the image or the map. Further, if the shortest route is selected, a point where the cluster area can be sampled at the shortest distance is extracted, and the shortest route is also displayed. If the center of the cluster is selected, the vicinities of the centers of the clusters are extracted on the feature space, and the representative points are extracted from the corresponding areas on the image or the map. In setting of the sampling points, the user may designate not only the sampling number but also a desired candidate area on the image or the map.

Accordingly, the sampling points can be fixed in accordance with the purpose or operation of the user.

[Seventh Embodiment]

Figure 12:
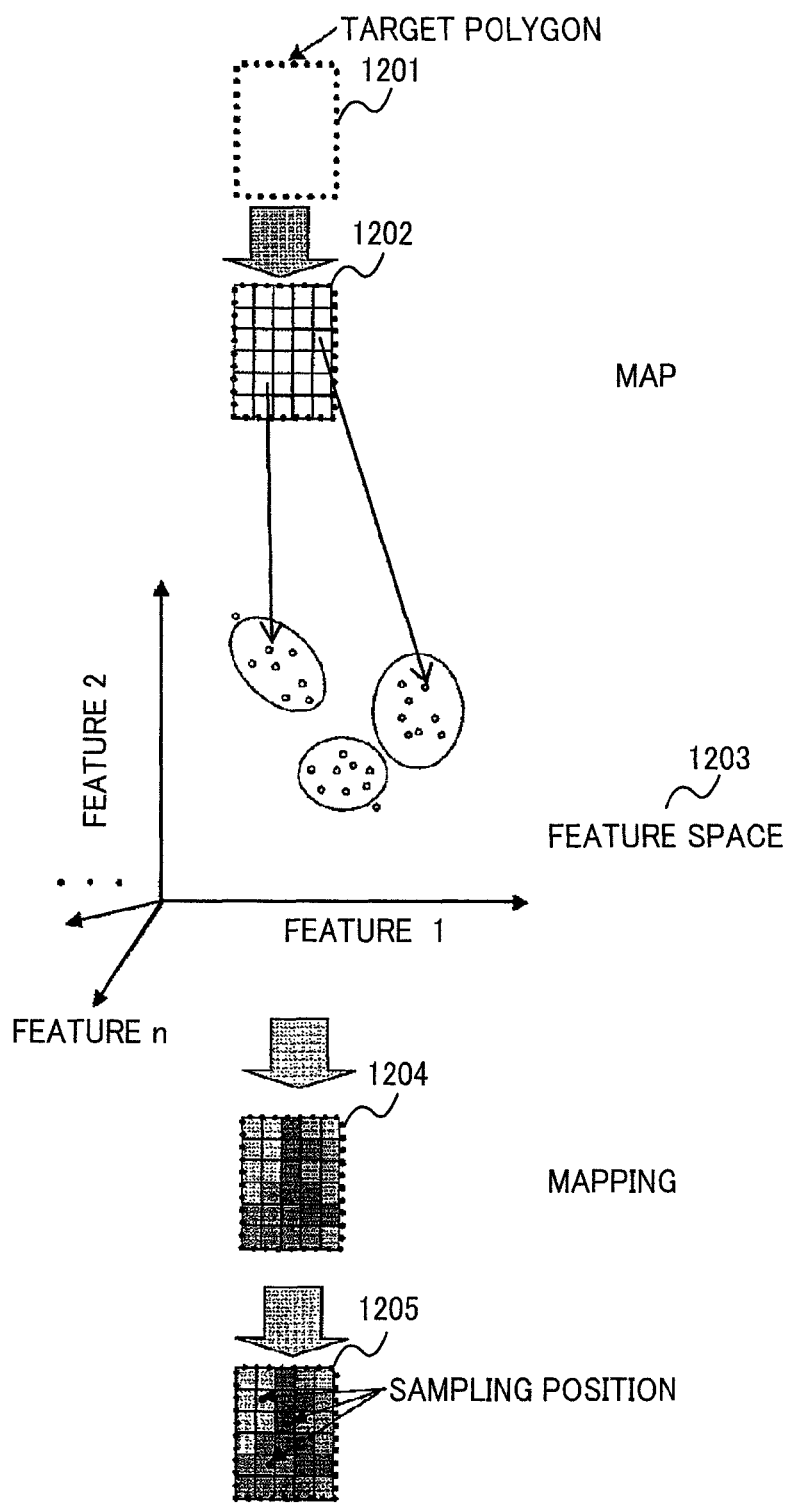
FIG. 12 shows an example of a process in which a target area is divided into small areas to extract features in the embodiment.

Next, an example of fixing sampling positions by performing clustering based on small areas in a target polygon will be described with reference to FIG. 1 and FIG. 12.

The feature extracting unit 107 divides a target polygon 1201 into small areas 1202. The target polygon is divided into mesh-like small areas in accordance with a size and a division number set by the user. Further, the mesh direction may be set in the direction same as the longitudinal direction of the polygon in accordance with the shape of the polygon. The feature extracting unit 107 extracts the features from the divided small areas. As the representative feature, an average value in the area may be obtained, or a mode may be obtained. Further, plural features may be extracted as representative features.

The classification processing unit 108 performs the clustering for the extracted representative features of the areas on a feature space 1203 to obtain a desired number of clusters. The clustering result is mapped on the image or the map to create a clustering result image 1204. In the clustering result, cluster numbers to which the representative features of the respective small areas belong are allocated to the all small areas.

The space analyzing unit 109 groups adjacent small areas on the basis of the clustering result 1204, representative areas are extracted from the obtained area groups. As the representative areas, the centroids of the groups of areas may be extracted, or adjacent small areas belonging to the same cluster may be extracted. The representative point extracting unit 110 extracts the center points of the extracted representative areas as sampling positions. Further, the extracted representative areas may be extracted as sampling areas.

Accordingly, effects of noise can be reduced in an image containing large amounts of noise, and the clustering result enabling easy space analysis can be obtained.

[Eighth Embodiment]

Next, an example of fixing sampling positions used when water quality sampling is performed will be described with reference to FIG. 13 and FIG. 14.

Figure 13:
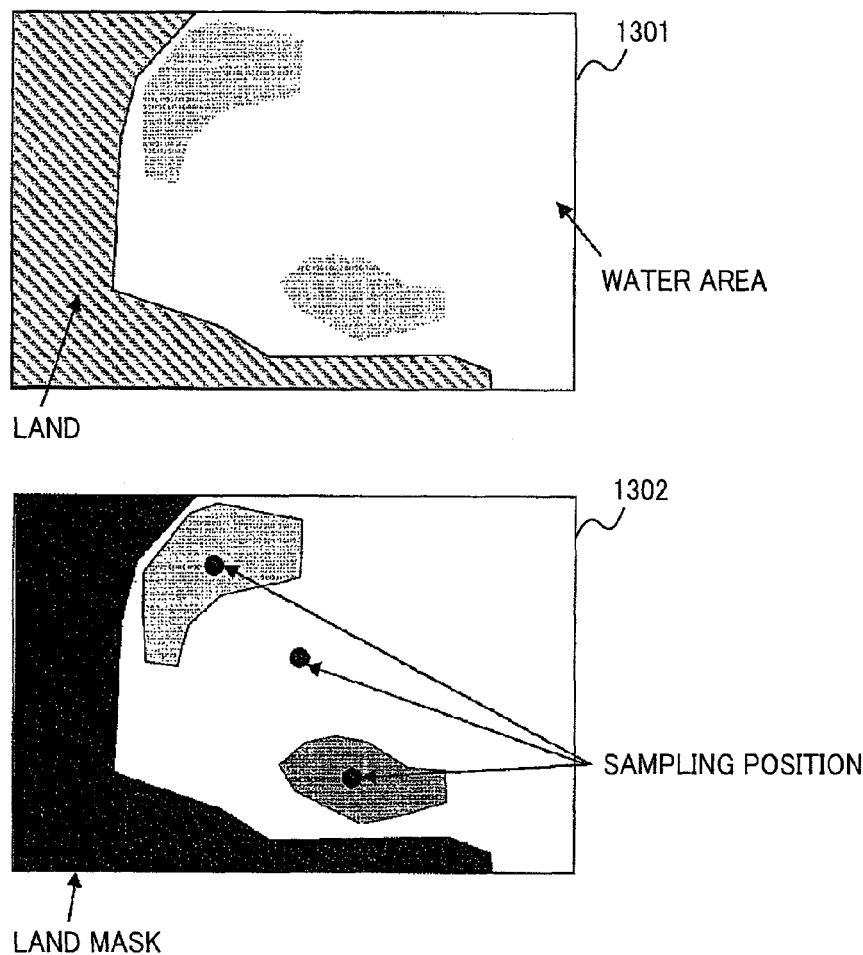
FIG. 13 shows an example of a result of a process in which sampling points for water quality are fixed in the embodiment.
Figure 14:
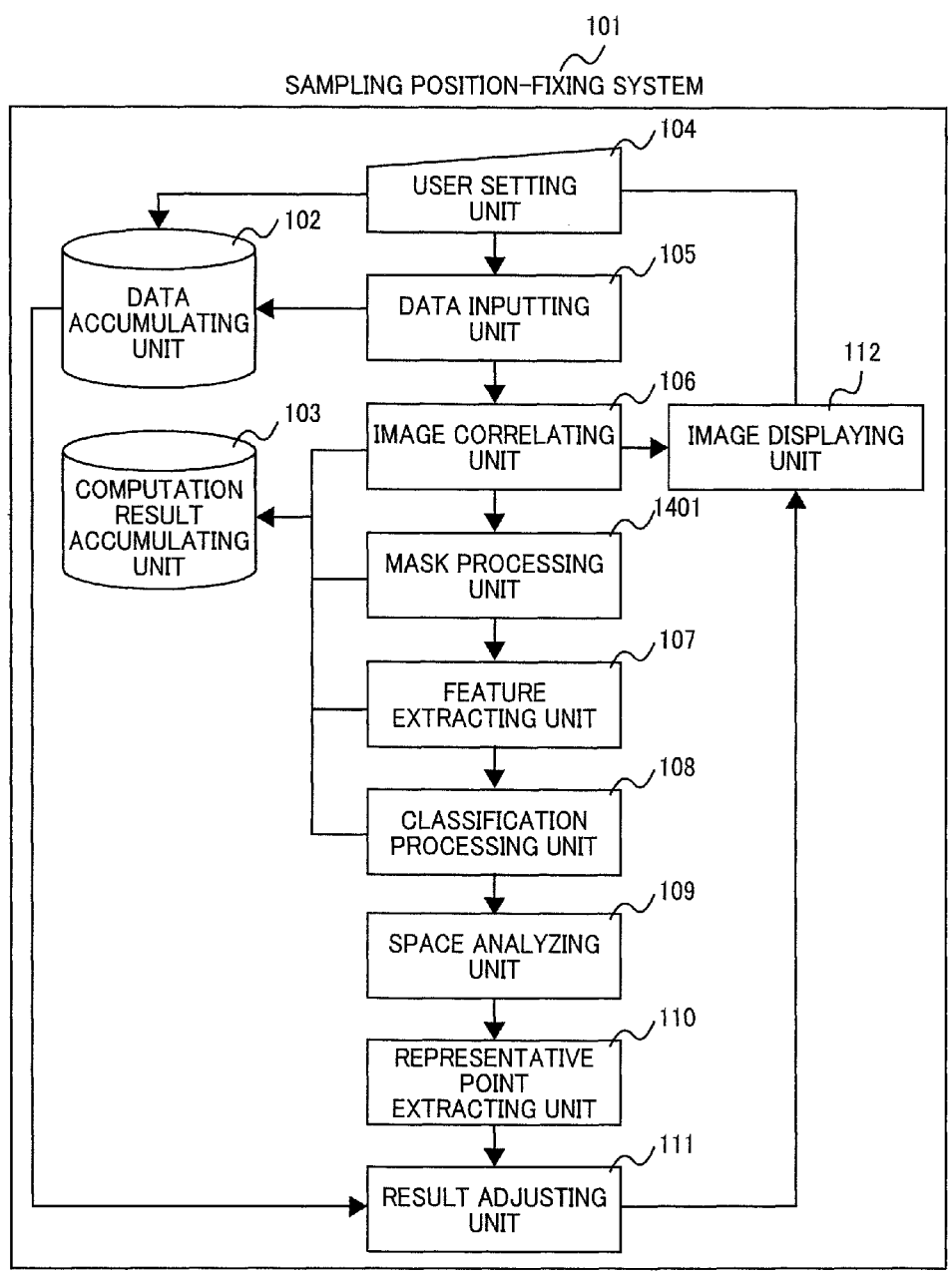
FIG. 14 is a functional configuration diagram of the sampling position-fixing system to which a mask processing unit is added in the embodiment.

FIG. 13 shows an application in which sampling positions are obtained for an area including a land area and a water area.

An area 1301 includes a land area and a water area, and the water area has areas with different water qualities. The image correlating unit 106 correlates the positions of the map and the image with each other. A mask processing unit 1401 masks a non-target area, namely, the land area other than the water area in this case. The feature extracting unit 107 extracts the features from the image obtained after the mask process. The classification processing unit 108 performs the clustering for the extracted features on the feature space. The number of clusters to be clustered corresponds to the number set by the user using the user setting unit 104. Further, the number of clusters may be a preliminarily-set number. On the basis of the clustering result created by the classification processing unit 108, the representative point extracting unit 110 extracts the representative points from the respective areas. The representative points are selected by the result adjusting unit 111 so that one representative point is selected from each cluster, and the selected representative points are used as sampling points. The extracted sampling points are displayed on the image displaying unit 112. As described above, the mask process is performed for the analyzing target area in advance, so that unnecessary areas on the feature space can be removed by the clustering process. Thus, the accuracy of clustering can be improved and the reliability of the sampling positions can be enhanced.

Accordingly, the sampling points for the water quality can be fixed.

It should be noted that the water area and the land area are exemplified in this case. However, a combination of a water area and an artificial material such as a ship, or a combination of a water area and an ice area such as an ice in the sea may be used. Further, the embodiment can be applied to not only the sampling for measuring water quality, but also sampling for measuring air pollution or soil contamination.

[Ninth Embodiment]

Figure 17:
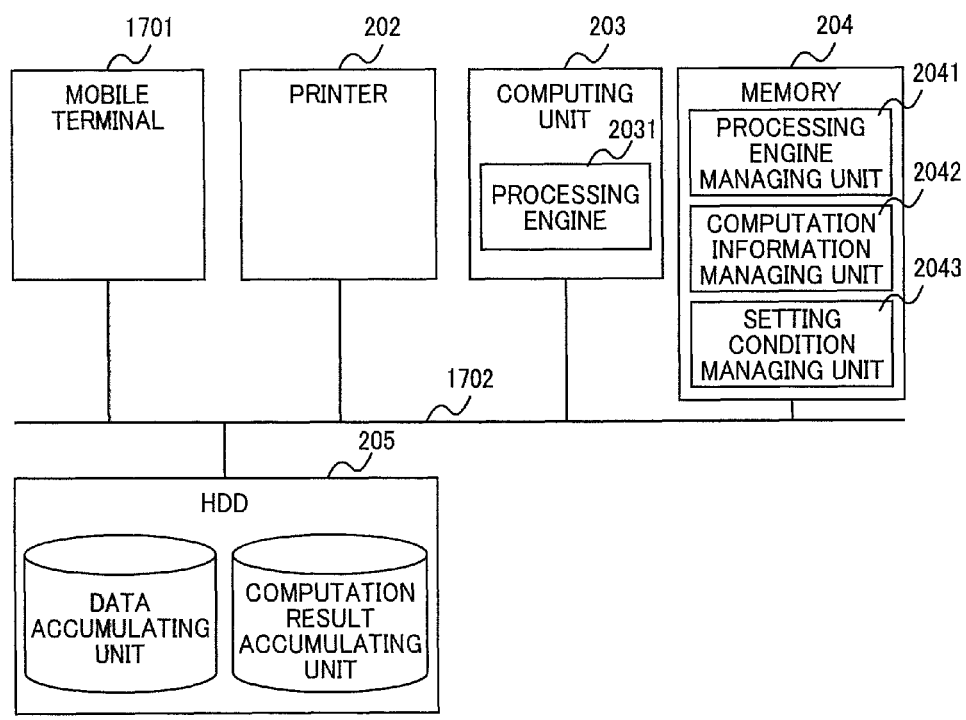
FIG. 17 is a physical configuration diagram of the sampling position-fixing system in the embodiment.

Next, a display example of sampling points on a mobile terminal and a physical configuration of the sampling position-fixing system 101 will be described with reference to FIG. 15 and FIG. 17.

Figure 15:
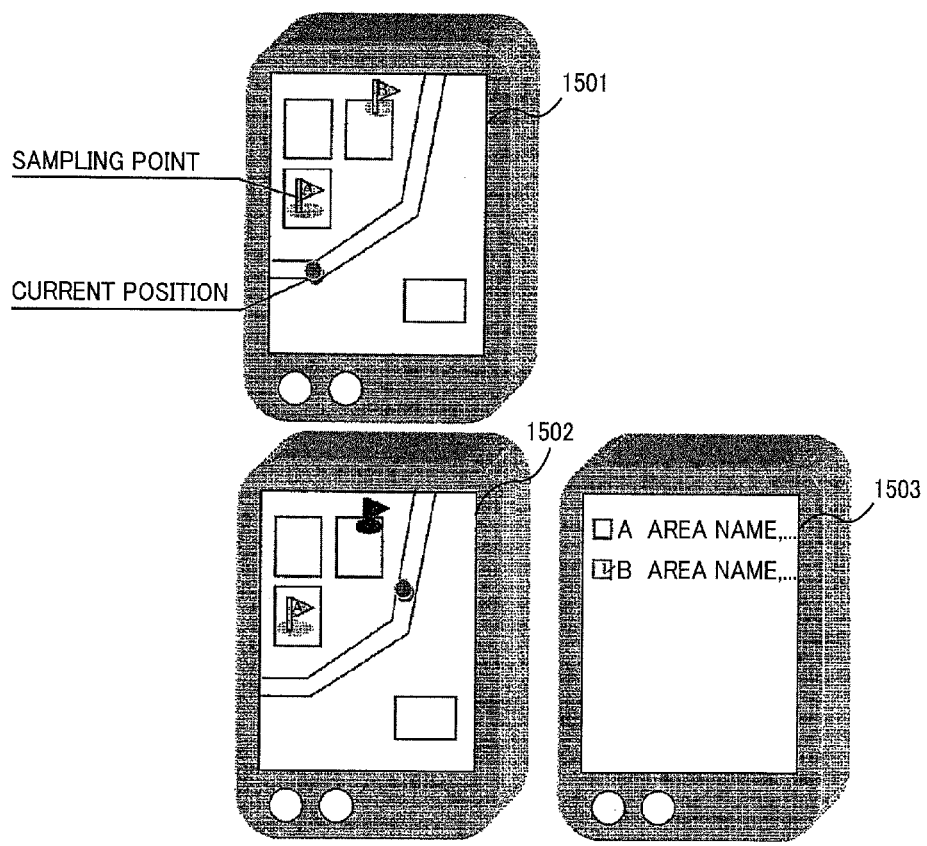
FIG. 15 shows a display example in which the sampling positions are displayed on a mobile terminal in the embodiment.

FIG. 15 shows an example in which sampling points are obtained by the sampling position-fixing system 101 to be displayed on a mobile terminal. FIG. 17 shows a physical configuration diagram of the sampling position-fixing system 101.

A positioning system such as a GPS is incorporated in a mobile terminal, and the position of the mobile terminal can be displayed on a map. Marks for the current position and the sampling points are displayed on the image or the map of a terminal screen 1501. The sampling points are displayed while alphabets such as A, B, and C are allocated thereto. Further, a sampling route may be illustrated as shown in the fourth embodiment. When the sampling from the sampling point B on the terminal screen 1501 is completed, the mark for a sampling end point is inverted as shown on a terminal screen 1502. Further, information of the sampling points is displayed as text information, as shown on a terminal screen 1503. The text information includes point names, areas, addresses, polygon numbers, IDs, sampling numbers and the like. The presence or absence of the sampling may be selected on the text information screen 1503 or the map display screen 1502. Further, the actual sampling point is obtained by the GPS or the like incorporated in the mobile terminal, and the sampling point can be registered. Accordingly, the actual sampling point and the sampling positions fixed by the sampling position-fixing system 101 can be recorded. Further, the sampling point may be registered in such a manner that when staying at the sampling point for a certain period of time, it is automatically determined that the sampling has been completed, and the mark is inverted. Further, the user can edit the sampling position on the mobile terminal screen 1501 in view of the situation of the field. In such a case, the user setting unit 104 accepts the edited content to change the sampling point stored in the computation result accumulating unit 103, and stores the changed information. In addition, an additional sampling point may be set on the screen 1501 by the user. The set new sampling point is stored in the computation result accumulating unit 103.

Accordingly, the sampling position can be easily recognized in the field, and the sample and the position can be easily associated with each other.

Next, a physical configuration of the sampling position-fixing system 101 in the case where a mobile terminal is used will be described with reference to FIG. 17. As shown in FIG. 17, the entire system configuration including the sampling position-fixing system 101 is configured to include a mobile terminal 1701, the printer 202, the computing unit 203, the memory 204, and the HDD (Hard Disk Drive) 205, all of which are coupled to each other through a network 1702. The computing unit and the memory configure a server on the network. In addition, the computing unit 203 and the memory 204 may be coupled to the HDD 205 through a bus.

The sampling position-fixing system 101 includes a transmission unit that transmits data to the mobile terminal 1701 and a reception unit that receives data from the mobile terminal 1701. The mobile terminal 1701 transmits and receives data to/from the sampling position-fixing system, so that an input image and data such as a result calculated by the server are displayed. In addition, the mobile terminal 1701 accepts a command from the user to be transmitted to the server on the network. Further, the computing unit 203, the memory 204, and the HDD 205 may be provided in the mobile terminal. The mobile terminal 1701 may be separated from the network 1702, or may be coupled to the network 1702 to obtain data or the like if necessary.

[Tenth Embodiment]

Next, an example in which a previous sampling point is displayed for comparison will be described with reference to FIG. 16.

Figure 16:
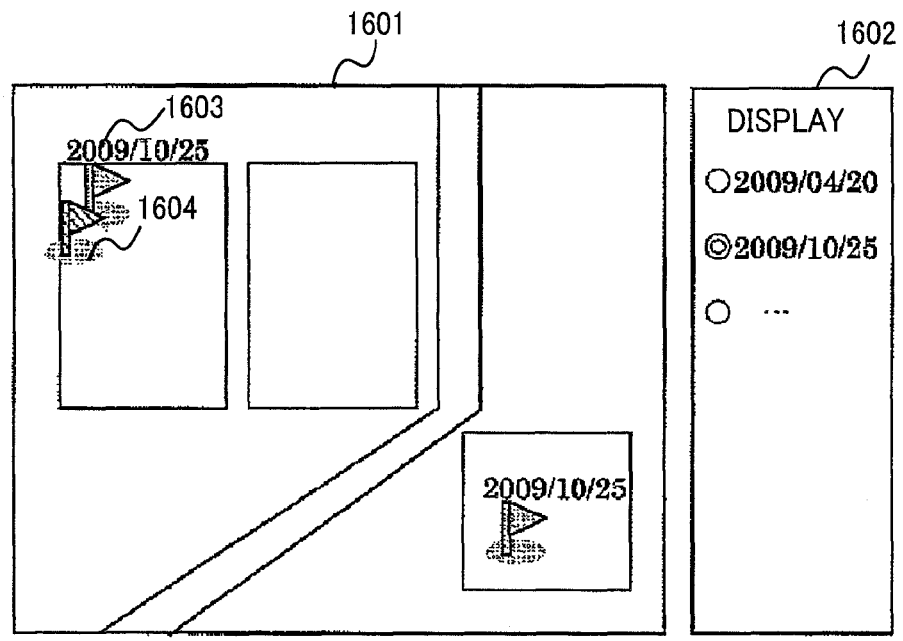
FIG. 16 shows a display example in which past sampling positions are displayed on a screen in the embodiment.

FIG. 16 shows an example of a screen on which a sampling position is fixed by the sampling position-fixing system 101 and the result is displayed.

A map or an image is displayed on a screen 1601, and a sampling position 1604 is displayed as a symbol mark. Past sampling dates are displayed on a display selection screen 1602. If a desired date is selected, a past sampling position 1603 is displayed on the screen 1601. The past sampling point is displayed together with not only the symbol mark but also a date. Further, a date, a position, and a difference in analysis results of samples may be expressed by changing the color of the symbol mark. In the case where the sampling position fixed by the sampling position-fixing system 101 is the same as the past sampling point, the user may designate and edit the sampling position on the screen. In addition, in the case where the user wants to check time-series changes of a point where the samplings were performed many times in the past, the user may designate on the screen to input an additional sampling point. These past sampling positions are stored in the data accumulating unit of the HDD 205. Thus, information is appropriately taken out of the data accumulating unit to be displayed on the screen as described above.

Accordingly, the sampling point can be edited and given a meaning by displaying the past sampling point for comparison.

[Eleventh Embodiment]

Figure 18:
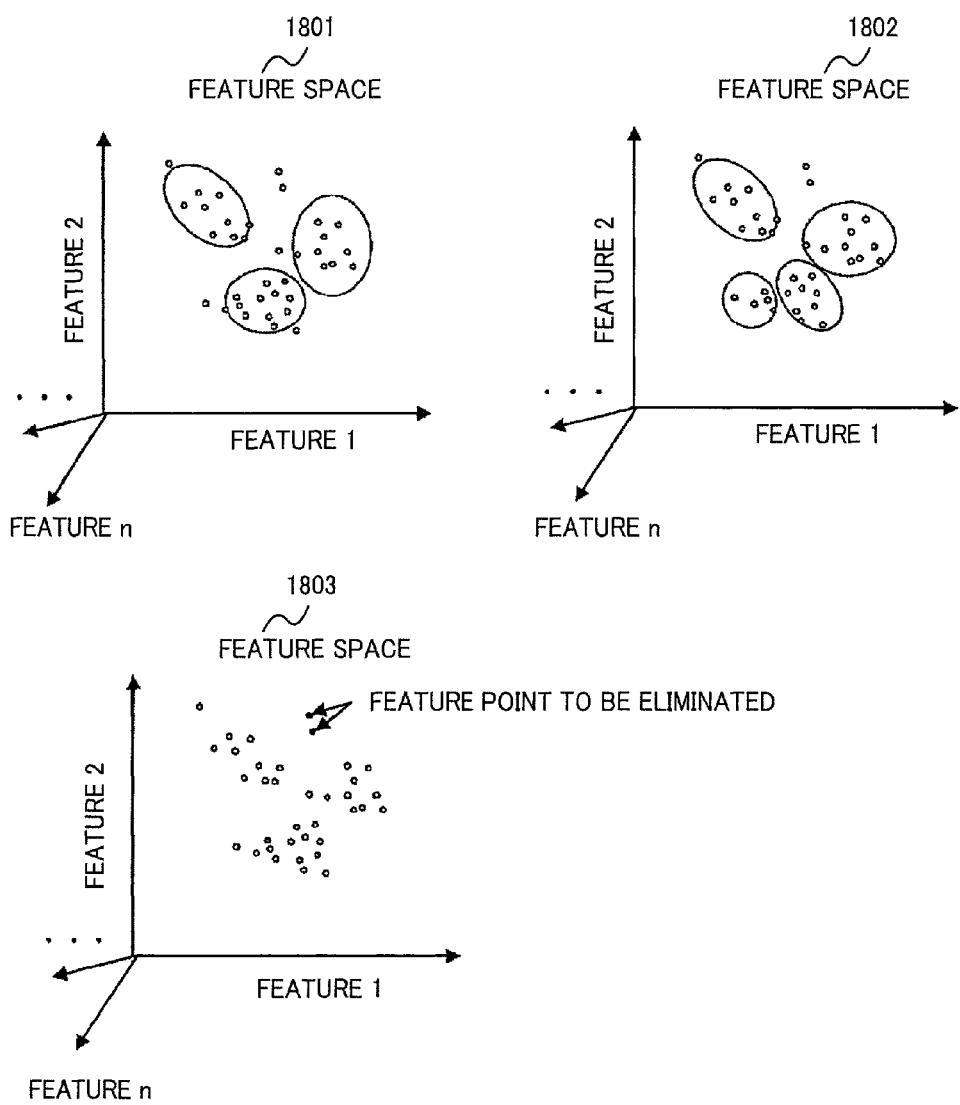
FIG. 18 shows an example in which a parameter for clustering is changed by a user in the embodiment.

Next, an example of amending a clustering result by the user will be described with reference to FIG. 18.

A feature space 1801 shows a diagram of a result obtained by clustering in the feature space by the classification processing unit 108. The number of clusters is 3 as an initial setting, and the features extracted from the analyzing target area by the feature extracting unit 107 are classified into three clusters. The user changes the clusters to an arbitrary number of clusters while referring to the feature space 1801, and the result obtained by clustering by the classification processing unit 108 again is expressed on a feature space 1802. Further, not only the feature space, but also the clustering result image calculated by the space analyzing unit 109 may be referred to. In this case, the clustering result can be confirmed on the map or the image, so that a setting of a parameter set by the user can be intuitively and easily understood. The optimum number of clusters and the optimum clustering result judged by the user while continually referring to the result obtained by changing the parameter such as the cluster number are passed on to the space analyzing unit 110. The user may judge while referring to the clustering result on the feature space, or may judge while referring to the clustering result mapped on the map or the image. Further, the classification processing unit 108 may calculate and display statistics of the clustering result to judge while referring to the same.

Further, the feature points that are determined as noise by the user can be eliminated as shown on a feature space 1803. The removed points are represented by the black points. The feature points to be eliminated are selected on the screen with a mouse or the like by a user. Accordingly, noise and unnecessary feature points can be eliminated, and thus the accuracy of clustering can be improved.

With the above-described process, the user can set the parameter for the clustering while referring to the clustering result, and thus the clustering that is understandable by the user can be performed.

[Twelfth Embodiment]

Figure 19:
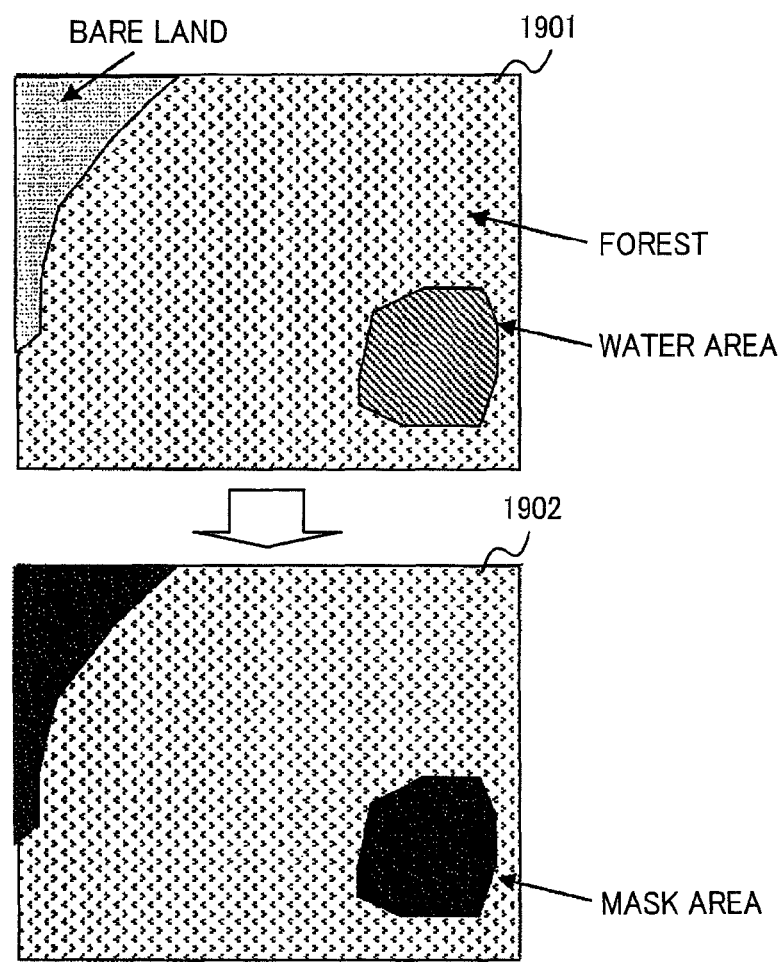
FIG. 19 is a diagram for showing a case in which a map is not used in the embodiment.

Next, an example of setting a target area without using map data will be described with reference to FIG. 1 and FIG. 19. An example of sampling surveys on various woods in a forest that is an analyzing target will be shown.

It is assumed that an analyzing target area 1901 includes a forest, a water area, a bare area, and the like. In the first place, only the forest area is extracted as a target, and other areas are masked. In the mask process, vegetation indexes calculated using a satellite image having plural pieces of spectral information are used. For example, NDVI (Introduction to Remote Sensing, J. B. Campbell, Taylor & Francis, pp. 466-468, 2002) is used for the vegetation indexes, so that pixels with NDVI values larger than a threshold can be extracted as a vegetation area. Further, instead of using the vegetation indexes, the clustering may be performed for the entire analyzing target area using the above-described clustering method to extract only pixels belonging to forest clusters on the feature space. Further, the user may visually designate the target area on the screen with a mouse or the like to fix the forest area to be analyzed. Pixels other than those extracted as the forest area are masked. With the above-described process, a mask-processed image 1902 can be obtained.

Further, in the case where the target area is distributed in a wide range and objects in the analysis image are all analyzing targets, samples are extracted from the entire image as the target area without using the map and the mask process.

The feature extracting unit 107 extracts the features from the forest area of the extracted mask-processed image 1902, and the clustering process is performed by the classification processing unit 108 to be classified into a desired number of clusters. After receiving the clustering result and being processed by the space analyzing unit 109, the representative point extracting unit 110 fixes the sampling positions.

As described above, even in the case where a map cannot be obtained, the target area can be extracted only with an input image without using a map. Further, in the case where the target area is distributed in a wide range, a process can be performed with the above-described method.

[Thirteenth Embodiment]

Figure 20:
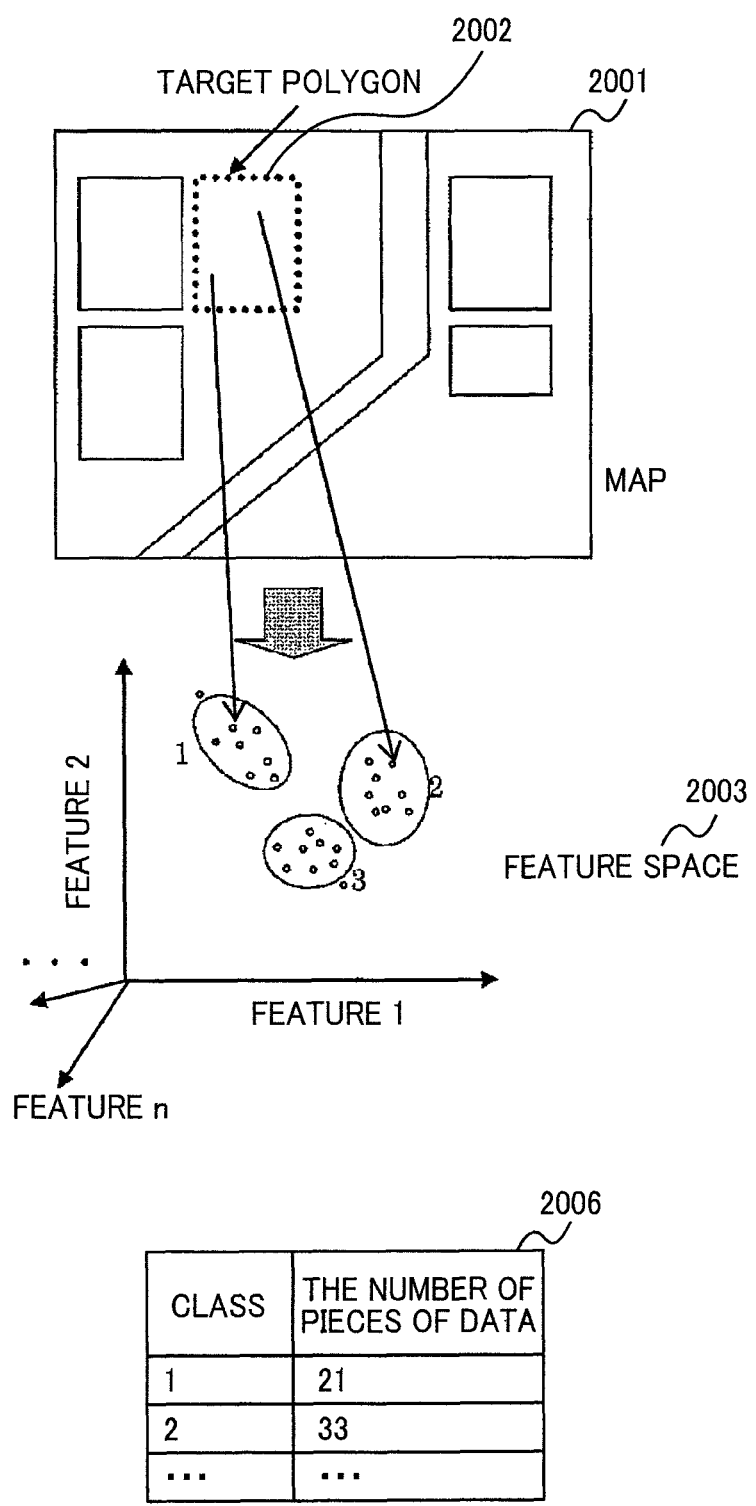
FIG. 20 is a diagram for showing a case in which after extracting plural samples from a target area, the samples are mixed to make one sample in the embodiment.

Next, an embodiment in which after extracting plural samples from a target area, they are mixed to make one sample will be described with reference to FIG. 20.

In the case of mixing plural samples to make one sample, if the same number of samples is collected from each sample point, the representative value of the target area cannot be obtained. Therefore, it is necessary to collect an appropriate amount of samples from each sample point. The following is a case in which after clustering the target area with the above-described method, the samples are extracted from the representative points. The representative points belong to a certain cluster as shown on a feature space 2003, and the number of pieces of data belonging to the cluster can be recognized on the basis of the clustering result. The clusters and the number of pieces of data belonging to the cluster can be expressed as shown in a table 2006. Here, the number of pieces of data is that of pixels of a satellite image or the like. The amount of samples is determined on the basis of a ratio of all data to the number of pieces of data belonging to each cluster. If it is assumed that the total amount of mixed samples is ×g, 0.2×g of the sample and 0.3 g of the sample can be obtained from classes 1 and 2, respectively. Here, it is difficult to recognize the amount of samples in the field with accuracy in many cases. Thus, the fraction of the amount of samples is rounded up to easily perform the sampling. The amount of samples is output by an outputting device to be recognized by a person who performs the sampling can recognize the same.

With this method, even in the case where plural samples are mixed, an appropriate amount of samples is collected from the fixed sample point, and thus a sampling status can be recognized in consideration of variation of target areas.

Although the explanation of the embodiments is completed, the aspects of the present invention are not limited to those.

In the embodiments, an aerial photograph such as a satellite image is used. However, an image obtained from a camera or a sensor for measuring on the ground may be used. The map data are not limited to a map, but may be data containing any position information (latitudes, longitudes, coordinates and the like).

In addition, concrete configurations of the hardware, the program, and the like can be appropriately changed without departing from the scope of the present invention.

The invention claimed is:

1. A sampling position-fixing system comprising: an inputting unit that inputs image data as an analyzing target; an image correlating unit that correlates the image data with map data; a unit that extracts feature vectors of the image data correlated with the map data by the image correlating unit; a classification processing unit that performs clustering for the extracted feature vectors on a feature space to obtain a plurality of clusters of feature vectors; a center area setting unit that extracts feature vectors that locate in vicinity of centers of respective said plurality of clusters on the feature space and maps the extracted feature vectors on an image space to derive cluster center expressing areas respectively corresponding to the centers of the clusters; a representative point extracting unit that extracts representative points respectively representing said plurality of clusters from a plurality of candidate points composing said cluster center expressing areas by selecting one candidate point from the candidate points composing the cluster center expressing areas contained in areas corresponding to each of the clusters as a representative point, on the basis of distances from other representative points: and an outputting unit that outputs the extracted representative points as sampling positions.

2. The sampling position-fixing system according to claim 1,
wherein the feature extracting unit extracts the feature vectors in a plurality of polygon areas, the clustering is performed for the plurality of polygon areas, and the representative point extracting unit extracts a predetermined number of sampling points from the plurality of polygon areas.

3. The sampling position-fixing system according to claim 1, further comprising a shortest route searching unit,
wherein the shortest route searching unit is configured to extract a plurality of routes that respectively start from a designated access point and take a round of all of representative cluster center expressing areas respectively selected from the cluster center expressing areas corresponding to each of the clusters, and to search for a shortest route that have a shortest total distance among the extracted routes,
and each of the representative point is extracted from each of the representative cluster center expressing area that is located on the searched shorted route.

4. The sampling position-fixing system according to claim 1, wherein
the inputting unit accepts designation of a sampling number, and the outputting unit outputs the sampling positions corresponding to the input sampling number.

5. The sampling position-fixing system according to claim 1,
wherein the feature extracting unit creates subject areas in an area of the image data, and extracts each of the feature vectors of the image data from a representative feature of each of the subject areas.

6. The sampling position-fixing system according to claim 1, further comprising a mask processing unit that masks an area other than sampling point targets in advance.

7. The sampling position-fixing system according to claim 1, further comprising a transmission/reception unit that transmits and receives data to/from a mobile terminal, wherein
the transmission/reception unit transmits information of the sampling positions to the mobile terminal.

8. The sampling position-fixing system according to claim 1, further comprising a data accumulating unit, wherein
the data accumulating unit stores past sampling points, and the outputting unit also outputs the past sampling points.

9. The sampling position-fixing system according to claim 1, wherein
the outputting unit displays the extracted sampling points while the extracted sampling points are overlapped with the image data and the map data.

10. The sampling position-fixing system according to claim 1, wherein
the clustering is performed on the basis of the number of clusters set by the inputting unit.

11. The sampling position-fixing system according to claim 1, further comprising a unit that changes the setting of the clustering.

* * * * *